United States Patent
Kim et al.

(10) Patent No.: US 6,707,524 B2
(45) Date of Patent: Mar. 16, 2004

(54) FRINGE FIELD SWITCHING MODE LIQUID CRYSTAL DISPLAY, AND FABRICATION METHOD THEREFOR

(75) Inventors: Chul Ha Kim, Kyoungsangbuk-do (KR); Hee Chul Jung, Kyoungki-do (KR); Pyung Soo Ha, Seoul (KR); Chi Wook An, Kyoungki-do (KR)

(73) Assignee: Boe-Hydis Technology Co., Ltd., Kyoungk-do (KR)

( * ) Notice: Subject to any disclaimer, the term of this patent is extended or adjusted under 35 U.S.C. 154(b) by 0 days.

(21) Appl. No.: 09/997,794

(22) Filed: Nov. 30, 2001

(65) Prior Publication Data

US 2002/0067453 A1 Jun. 6, 2002

(30) Foreign Application Priority Data

Dec. 1, 2000 (KR) .......................................... 2000-72279

(51) Int. Cl.[7] .......................... G02F 1/1368; G02F 1/139
(52) U.S. Cl. ............................ 349/141; 349/37; 349/43
(58) Field of Search .......................... 349/43, 139, 141, 349/143, 37; 345/92, 96; 438/30

(56) References Cited

U.S. PATENT DOCUMENTS 5,448,385 A * 9/1995 Deffontaines et al. ...... 349/141
2001/0043303 A1 * 11/2001 Shibahara et al. .......... 349/141

* cited by examiner

*Primary Examiner*—Kenneth Parker
*Assistant Examiner*—Tai Duong
(74) *Attorney, Agent, or Firm*—Ladas & Parry

(57) ABSTRACT

The present invention relates to a fringe field switching mode liquid crystal display, comprising: gate lines and data lines aligned on a transparent insulating substrate to vertically cross each other; common electrode lines aligned horizontally to the gate lines; a pixel region defined in a space formed by the gate lines and data lines; a first transparent electrode formed in the pixel region, and divided into at least two regions; and a second transparent electrode insulated from the first transparent electrode, and divided on the first transparent electrode as many as the first transparent electrode, a data voltage being applied to the second transparent electrode in a first region and to the first transparent electrode in a second region, a sum of the voltages applied to the pixel region having a zero voltage.

9 Claims, 4 Drawing Sheets

FRINGE FIELD SWITCHING MODE LIQUID CRYSTAL DISPLAY, AND FABRICATION METHOD THEREFOR

BACKGROUND OF THE INVENTION

1. Field of the Invention

The present invention relates to a fringe field switching (FFS) mode liquid crystal display (LCD), and in particular to an FFS mode LCD and a fabrication method therefor which can improve an image quality by separately aligning one pixel so that pixel voltages can offset each other to be a zero voltage.

2. Description of the Background Art

A conventional thin film LCD is used as an information display device such as an information display window of a portable terminal, a screen display of a notebook computer, and a monitor of a laptop computer.

Especially, the LCD can replace a general cathode ray tube type monitor (CRT), which has high industrial applicability.

In the conventional LCD is generated a remaining image of a previous frame for a few seconds. Even though a fixed image pattern is applied to the liquid crystal for a predetermined time and the image pattern is removed, the image pattern remains weakly for a predetermined time.

In an in plane switching (IPS) mode or a fringe field switching (FFS) mode for embodying a field angle wider than a general TN mode, the remaining image is maintained for a long time.

Ions are moved in one direction due to DC voltage elements transmitted in driving the liquid crystal, and thus a signal voltage is distorted to generate the remaining image.

Such a remaining image is frequently generated in the IPS mode LCD for driving the liquid crystal by forming electrodes on one substrate, as compared with the TN mode LCD for driving the liquid crystal by forming electrodes on upper and lower substrates.

The conventional FFS mode LCD will now be explained with reference to FIGS. 1 and 2.

FIG. 1 is a cross-sectional view illustrating a pixel structure of the conventional FFS mode LCD.

FIG. 2 is a plan view illustrating the pixel structure of the conventional FFS mode LCD.

The conventional FFS mode LCD forms a first transparent electrode Vcom; 4 on a glass substrate 2, and forms an insulating film 6 thereon.

A second transparent electrode Vdd; 8 is formed on the insulating film.

A plus frame voltage and a minus frame voltage are applied to the pixel electrode 8. Accordingly, the voltages offset each other, and an average voltage becomes zero.

However, slight DC elements are generally applied between the plug frame and the minus frame due to parasitic capacitance. Here, reference numeral 10 denotes gate lines, and 12 denotes data lines.

As described above, positive ions are moved in a cathode direction due to the DC elements, and fixed to a rear film in the cathode direction.

As a result, the signal voltage is distorted by the ions fixed to the rear film of the cathode electrode region. In the case of negative ions, the ions are moved in an anode direction, to cause the remaining image.

SUMMARY OF THE INVENTION

Accordingly, it is an object of the present invention to provide a fringe field switching mode liquid crystal display and a fabrication method therefor which can remove a remaining image due to a residual DC voltage, by dividing a fringe field switching mode pixel into at least two, and enabling the adjacent pixels to have opposite polarities, so that the voltages applied to the pixel has a zero voltage state.

In order to achieve the above-described object of the invention, there is provided a fringe field switching mode liquid crystal display, including: gate lines and data lines aligned on a transparent insulating substrate to vertically cross each other; common electrode lines aligned horizontally to the gate lines; a pixel region defined in a space formed by the gate lines and data lines; a first transparent electrode formed in the pixel region, and divided into at least two regions; and a second transparent electrode insulated from the first transparent electrode, and divided on the first transparent electrode as many as the first transparent electrode, a data voltage being applied to the second transparent electrode in a first region and to the first transparent electrode in a second region, a sum of the voltages applied to the pixel region having a zero voltage.

In addition, there is provided a method for fabricating a fringe field switching mode liquid crystal display having gate lines and data lines aligned on a transparent insulating substrate to vertically cross each other, common electrode lines aligned horizontally to the gate lines, a thin film transistor formed by a source and drain extended from the data line, and the gate line, and a pixel region defined in a space formed by the gate lines and data lines, including the steps of: forming a first transparent electrode in the pixel region to be divided into at least two regions; and forming a second transparent electrode to be insulated from the first transparent electrode and divided on the first transparent electrode as many as the first transparent electrode, a data voltage being applied to the second transparent electrode in a first region and to the first transparent electrode in a second region, a sum of the voltages applied to the pixel region having a zero voltage.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A fringe field switching (FFS) mode liquid crystal display (LCD) in accordance with a preferred embodiment of the present invention will now be described in detail with reference to the accompanying drawings.

Figure 1:
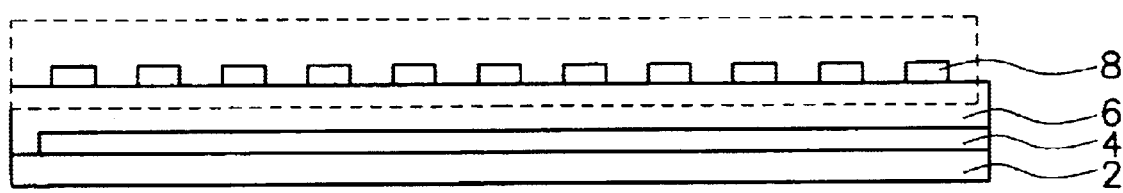
FIG. 1 is a side-sectional view illustrating a pixel structure of a conventional FFS mode LCD.
Figure 2:
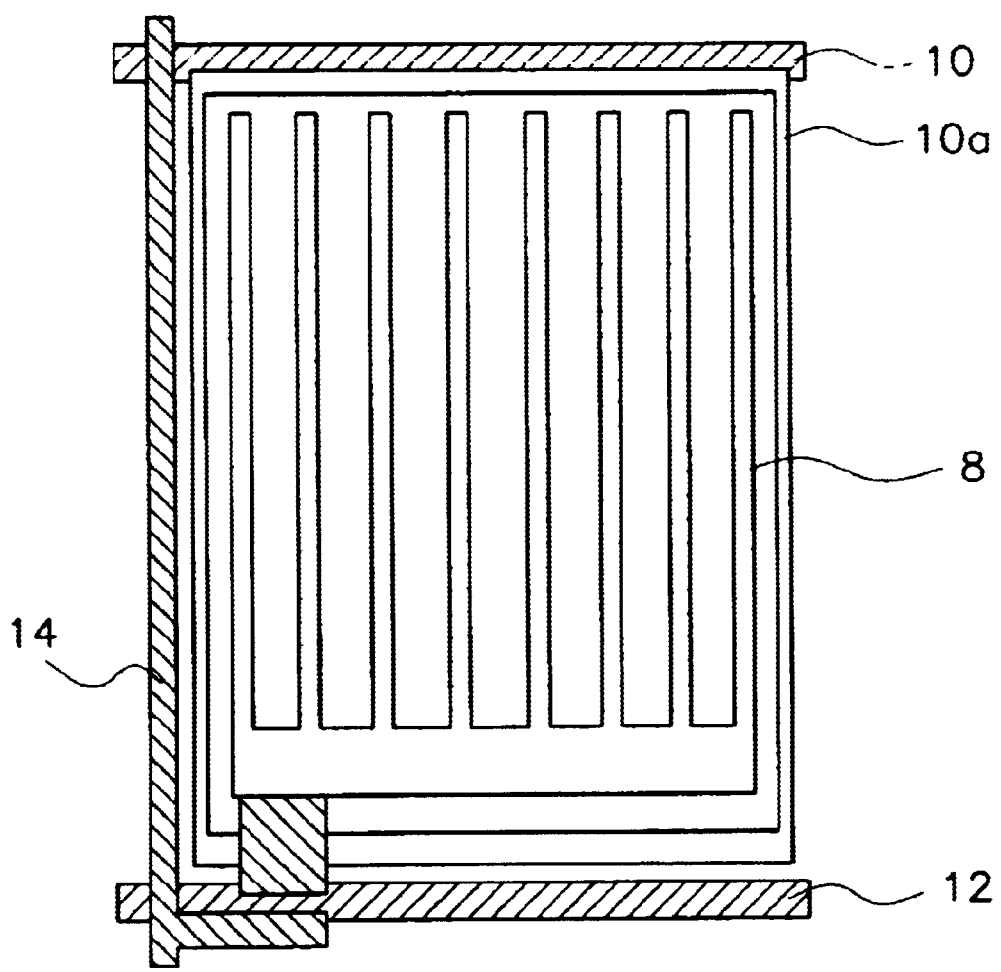
FIG. 2 is a plan view illustrating the pixel structure of the conventional FFS mode LCD.
Figure 3:
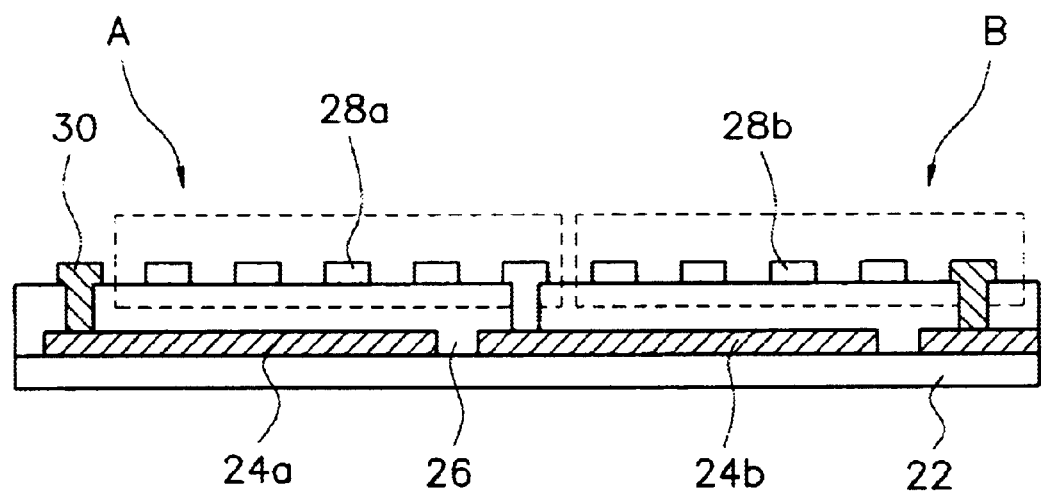
FIG. 3 is a cross-sectional view illustrating a pixel structure of an FFS mode LCD in accordance with the present invention.

FIG. 3 is a cross-sectional view illustrating a pixel structure of the FFS mode LCD in accordance with the present invention.

Figure 4:
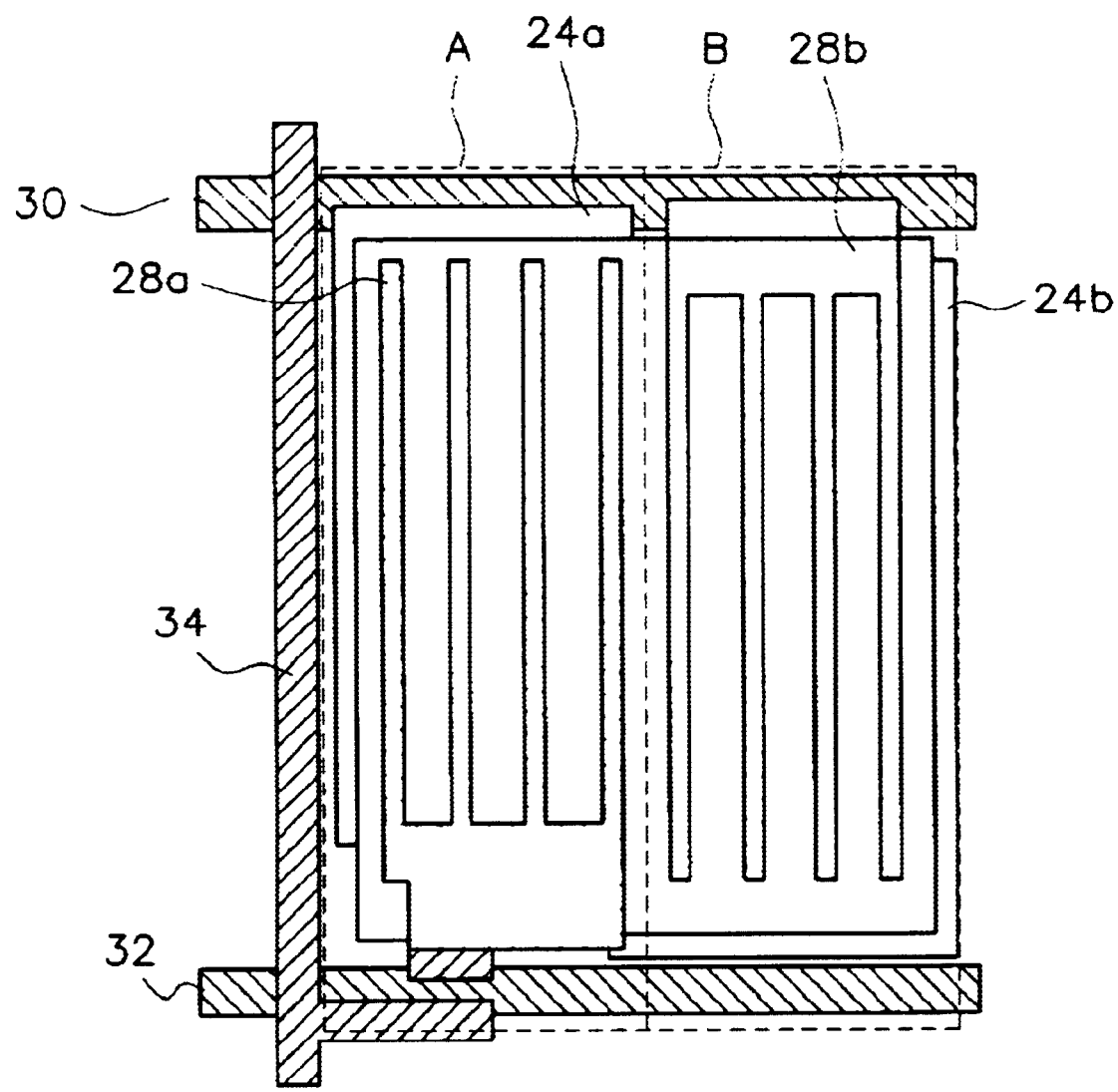
FIG. 4 is a plan view illustrating the pixel structure of the FFS mode LCD in accordance with the present invention.

FIG. 4 is a plan view illustrating the pixel structure of the FFS mode LCD in accordance with the present invention.

In the FFS mode LCD of the present invention, one unit pixel (not shown) is divided into two regions, namely regions A and B. For example, a data voltage Vdd is transmitted to an upper ITO electrode 28a through a drain electrode (not shown) of a data line 34 in region A, and the data voltage Vdd is transmitted to a lower ITO electrode 24b in region B. Here, Vcom, namely a common electrode is formed oppositely to the data voltage Vdd.

The voltages applied to regions A and B have the opposite polarities, so that a sum of the whole voltages in one pixel can be a zero voltage. It is thus possible to remove the DC voltage causing a remaining image.

The LCD of the present invention for completely removing the DC voltage will now be explained in more detail with reference to FIGS. 3 and 4.

Referring to FIG. 3, the FFS mode LCD deposits a transparent electrode layer including ITO on a glass substrate 22, and patterns the deposited layer to be divided into two regions, namely regions A and B, thereby forming first transparent electrodes 24a and 24b. Here, region A including the first transparent electrode 24a is connected to a common electrode 30, and region B including the first transparent electrode 24b is isolated.

Thereafter, a gate insulating film 26 is deposited on the whole structure including the first transparent electrodes 24a and 24b, and selectively patterned to connect the first transparent electrode 24b of region B, thereby forming a contact hole (not shown).

A second transparent electrode layer (not shown) including ITO is deposited on the gate insulating film 26 having the contact hole (not shown), and selectively patterned to form second transparent electrodes 28a and 28b. Here, the first transparent electrode 24a of region A and the second transparent electrode 28b of region B are connected to a common electrode 30, namely Vcom electrode.

In addition, a thin film transistor (TFT, not shown) is formed on the gate line 32, and a drain region of the TFT is connected to the second transparent region 28a of region A and the first transparent electrode 24b of region B. Therefore, an average voltage becomes a zero voltage.

In the FFS mode LCD, when the signal voltage Vdd of the data line 34 is applied through the TFT, the signal voltage Vdd is transmitted to the second transparent electrode 28a of region A and the first transparent electrode 24b of region B.

Here, the data voltage Vdd is applied to the second transparent electrode 28a positioned on region A in one first transparent electrode 24a, and Vcom is transmitted to the second transparent electrode 28b positioned on region B in the other first transparent electrode 24b.

Accordingly, when the data voltage Vdd is applied, the region A and the region B become the opposite polarities, and thus an average sum of the whole voltages in one pixel becomes zero.

As discussed earlier, in accordance with the present invention, the FFS mode LCD for removing the remaining image has the following advantages:

One FFS mode pixel is divided into two regions, and the voltages applied to both regions have the opposite polarities to offset each other, thereby removing the DC voltage to prevent the remaining image. Moreover, a contrast and image quality are improved by removing the DC voltage.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A fringe field switching mode liquid crystal display, comprising:

gate lines and data lines aligned on a transparent insulating substrate to vertically cross each other;

common electrode lines aligned horizontally to the gate lines;

a pixel region defined in a space formed by the gate lines and data lines;

a first transparent electrode formed in the pixel region, and divided into at least two regions having opposite polarities; and a second transparent electrode insulated from the first transparent electrode, and divided in the second transparent electrode into as many regions as in the first transparent electrode, a data voltage being applied to the second transparent electrode in a first region and to the first transparent electrode in a second region via a common electrical connection, the sum of the two data voltages applied to the pixel region having a zero voltage.

2. The device according to claim 1, wherein the first transparent electrode formed in the first region and the second transparent electrode formed in the second region are connected to a common electrode line to provide the common electrical connection.

3. The device according to claim 1, wherein the first transparent electrode is formed in a box shape, and the second transparent electrode is formed in a slit shape to apply an electric field to a liquid crystal.

4. The device according to claim 1, wherein the first transparent electrode and the second transparent electrode are used as pixel electrodes.

5. A method for fabricating a fringe field switching mode liquid crystal display having gate lines and data lines aligned on a transparent insulating substrate to vertically cross each other, common electrode lines aligned horizontally to the gate lines, a thin film transistor formed by a source and drain extended from the data line, and the gate line, and a pixel region defined in a space formed by the gate lines and data lines, comprising the steps of:

forming a first transparent electrode in the pixel region to be divided into at least two regions having opposite polarities; and forming a second transparent electrode to be insulated from the first transparent electrode and divided in the second transparent electrode into as many regions as in the first transparent electrode, such that when a data voltage is applied to the second transparent electrode in a first region and to the first transparent electrode in a second region via a common electrical connection, the average sum of the whole data voltages applied to the pixel region has a zero voltage.

6. The method according to claim 5, wherein the step for forming the first transparent electrode forms a first transparent electrode layer in the pixel region defined in a space formed by the gate lines and data lines, and patterns the first transparent electrode layer to form the first transparent electrode divided into at least two regions, first transparent electrode portions of the first and second regions being isolated.

7. The method according to claim 6, further comprising the steps of:

forming an insulating film over the structure resulting from performing the steps of claim 6 including the first transparent electrode divided into at least two regions, and forming a contact hole on the insulating film to expose the first transparent electrode portion of the second region; and forming a second transparent electrode layer on the insulating film having the contact hole, and forming a second transparent electrode divided into two regions by patterning the second transparent electrode layer.

8. The method according to claim 7, wherein the second transparent electrode portion of the first region is connected to a drain of the thin film transistor and the first transparent electrode portion of the second region.

9. The method according to claim 5, wherein the first transparent electrode is formed in a box shape, and the second transparent electrode is formed in a slit shape to apply an electric field to a liquid crystal.

* * * * *